(12) United States Patent
Collins

(10) Patent No.: US 7,535,915 B2
(45) Date of Patent: May 19, 2009

(54) SYSTEM AND METHOD FOR SCALABLE AND REDUNDANT SIP MESSAGE ROUTING IN AN IP MULTIMEDIA SUBSYSTEM

(75) Inventor: David Allan Collins, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 10/974,611

(22) Filed: Oct. 27, 2004

(65) Prior Publication Data

US 2006/0090001 A1 Apr. 27, 2006

Related U.S. Application Data

(63) Continuation-in-part of application No. 10/038,878, filed on Dec. 31, 2001, now Pat. No. 6,947,752.

(51) Int. Cl.
*H04L 12/28* (2006.01)
*H04L 12/56* (2006.01)

(52) U.S. Cl. .................................... 370/410

(58) Field of Classification Search ............. 370/328, 370/386, 395.31, 401, 465, 352, 356, 392, 370/395, 522, 410, 389, 474, 357; 379/88.13, 379/88.17, 88.28, 93.09, 221, 229, 228, 245; 455/16; 709/206, 230, 236, 237, 239, 245
See application file for complete search history.

(56) References Cited

U.S. PATENT DOCUMENTS

| | | | | |
|---|---|---|---|---|
| 6,816,706 B1 * | 11/2004 | Hohnstein et al. | ............. | 455/25 |
| 6,831,902 B1 * | 12/2004 | Dougherty et al. | ............ | 370/328 |
| 6,871,070 B2 * | 3/2005 | Ejzak | ................. | 455/435.1 |
| 6,954,654 B2 * | 10/2005 | Ejzak | ................. | 455/560 |
| 6,987,769 B1 * | 1/2006 | Dougherty et al. | ............ | 370/401 |
| 7,020,707 B2 * | 3/2006 | Sternagle | .............. | 709/230 |
| 2005/0021833 A1 * | 1/2005 | Hundscheid et al. | ......... | 709/236 |
| 2005/0074026 A1 * | 4/2005 | Soncodi et al. | ............. | 370/465 |

* cited by examiner

*Primary Examiner*—Edan Orgad
*Assistant Examiner*—Prenell P Jones

(57) ABSTRACT

An Internet Protocol (IP) multimedia subsystem for use in a telecommunication network. The IP multimedia subsystem comprises: 1) an IP switch for receiving Session Initiation Protocol (SIP) messages from an external IP network; and 2) a plurality of call application nodes capable of executing a plurality of service applications groups. The IP switch distributes the SIP messages to the plurality of call application nodes according to a load-sharing algorithm.

20 Claims, 3 Drawing Sheets

SYSTEM AND METHOD FOR SCALABLE AND REDUNDANT SIP MESSAGE ROUTING IN AN IP MULTIMEDIA SUBSYSTEM

CROSS-REFERENCE TO RELATED APPLICATION

The present invention is related to that disclosed in U.S. patent application Ser. No. 10/038,878, filed on Dec. 31, 2001 and entitled "System and Method for Distributed Call Processing Using Load-Sharing Groups." patent application Ser. No. 10/038,878 is assigned to the assignee of the present application. The subject matter disclosed in patent application Ser. No. 10/038,878 is hereby incorporated by reference into the present disclosure as if fully set forth herein. The present application is a continuation-in-part (CIP) of patent application Ser. No. 10/038,878 filed on Dec. 31, 2001 now U.S. Pat. No. 6,947,752 and hereby claims priority under 35 U.S.C. §120 to the filing date of patent application Ser. No. 10/038,878.

TECHNICAL FIELD OF THE INVENTION

The present invention generally relates to telecommunication systems and, more specifically, to a scalable and redundant IP multimedia subsystem (IMS) for performing SIP message routing.

BACKGROUND OF THE INVENTION

The 3GPP standard describes an Internet Protocol (IP) multimedia subsystem (IMS) that comprises the core network (CN) devices that provide IP multimedia services, including audio, video, text, chat and the like, and combinations thereof, delivered over the Internet and/or the public switched telephone network. Conventional IP multimedia subsystems generally comprise an IP switch and a single server. As network loading increases, more processors may be added to the server to cope with the increased throughput requirements.

However, at some point, adding more processors becomes inadequate due to limitations in the capacity of the server. For example, the bandwidth of the server may limit the usefulness of this approach. In a number of systems, it is not possible to add more processors. At that point, faster and more powerful processors must be added, which also is a limited approach.

Also, the conventional architecture of an IP switch and a single server is limited by a single point of failure. If the server fails, then all service is lost. The prior art IP multimedia subsystems use the IP switch to detect when a node has failed. The conventional IP multimedia subsystems do not detect when a server has failed.

Therefore, there is a need in the art for an improved IP multimedia subsystem that is capable of providing scalable service to cope with increased traffic requirements. In particular, there is a need for an IP multimedia subsystem that does not contain a single point of failure.

SUMMARY OF THE INVENTION

The present invention provides for the easy expansion of the number of nodes in an IP multimedia subsystem (IMS) in order to handle the expected network traffic. The IMS is more fault-tolerant because for any failure by a node, application server, or application level gateway, a backup device takes over to continue to provide service.

To address the above-discussed deficiencies of the prior art, it is a primary object of the present invention to provide an Internet Protocol (IP) multimedia subsystem for use in a telecommunication network. According to an advantageous embodiment of the present invention, the IP multimedia subsystem comprises: 1) an IP switch capable of receiving Session Initiation Protocol (SIP) messages from an external IP network; and 2) a plurality of call application nodes capable of executing a plurality of service applications groups, wherein the IP switch distributes the SIP messages to the plurality of call application nodes according to a load sharing algorithm.

According to one embodiment of the present invention, a first one of the plurality of service application groups is executed on a first one of the plurality of call application nodes and is associated with a similar second one of the plurality of service application groups executed on a second one of the plurality of call application nodes separate from the first call application node.

According to another embodiment of the present invention, the first and second service application groups form a first load-sharing group service application.

According to still another embodiment of the present invention, the first service application group comprises a first primary application executed on the first call application node and a first backup application associated with the first primary application.

According to yet another embodiment of the present invention, the first backup application resides on a call application node other than the first call application node.

According to a further embodiment of the present invention, the IP multimedia subsystem further comprises a plurality of front-end nodes capable of executing a plurality of application level gateway (ALG) applications, wherein the IP switch distributes the SIP messages to the plurality of front-end nodes for subsequent distribution to the plurality of call application nodes.

According to a still further embodiment of the present invention, a first of the ALG applications group comprises a first primary ALG application executed on the first call application node and a first backup ALG application associated with the first primary ALG application.

According to a yet further embodiment of the present invention, the first backup ALG application resides on a call application node other than the first call application node.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
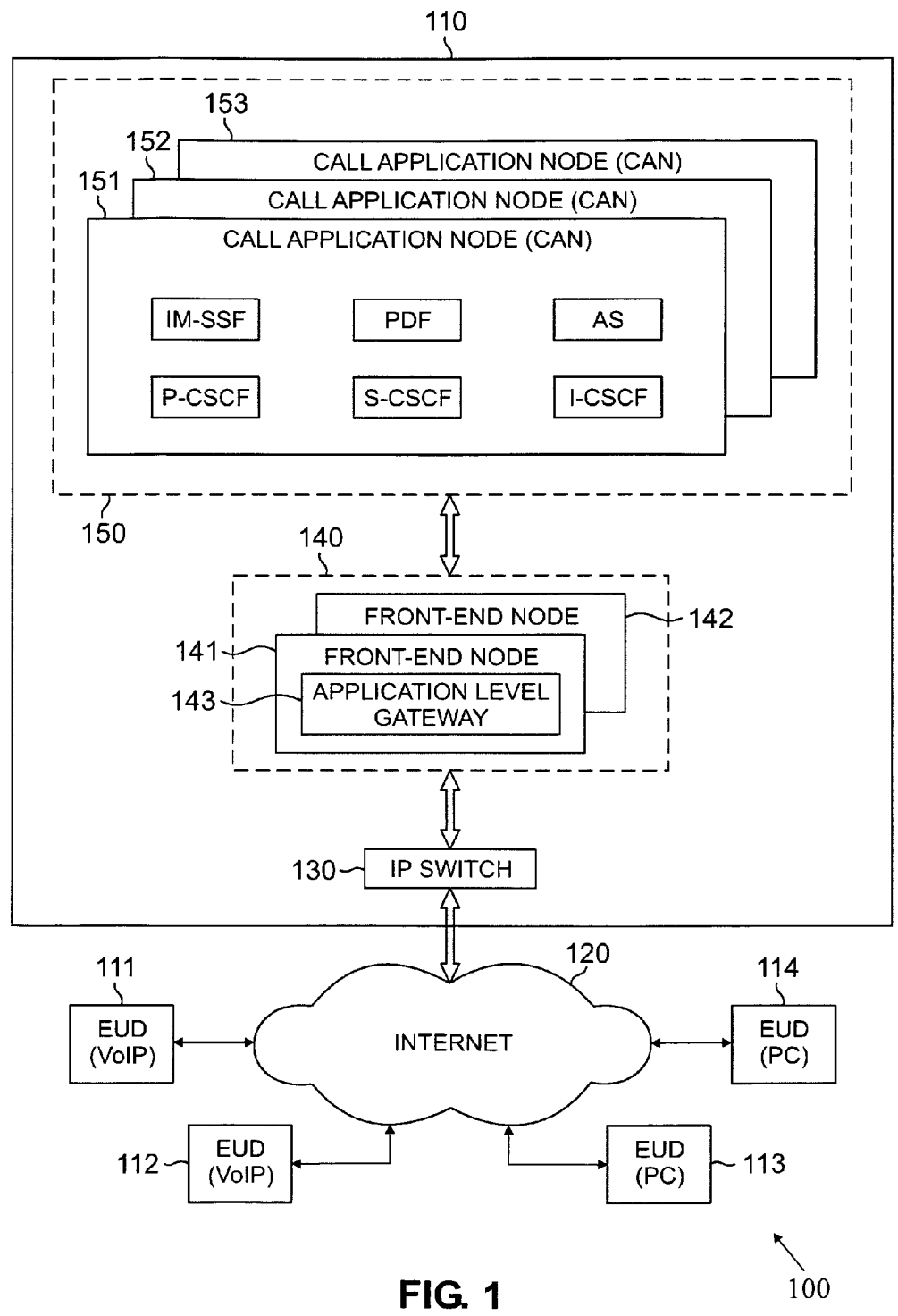
FIG. 1 illustrates a telecommunication network comprising an IP multimedia subsystem (IMS) according to the principles of the present invention.
Figure 2:
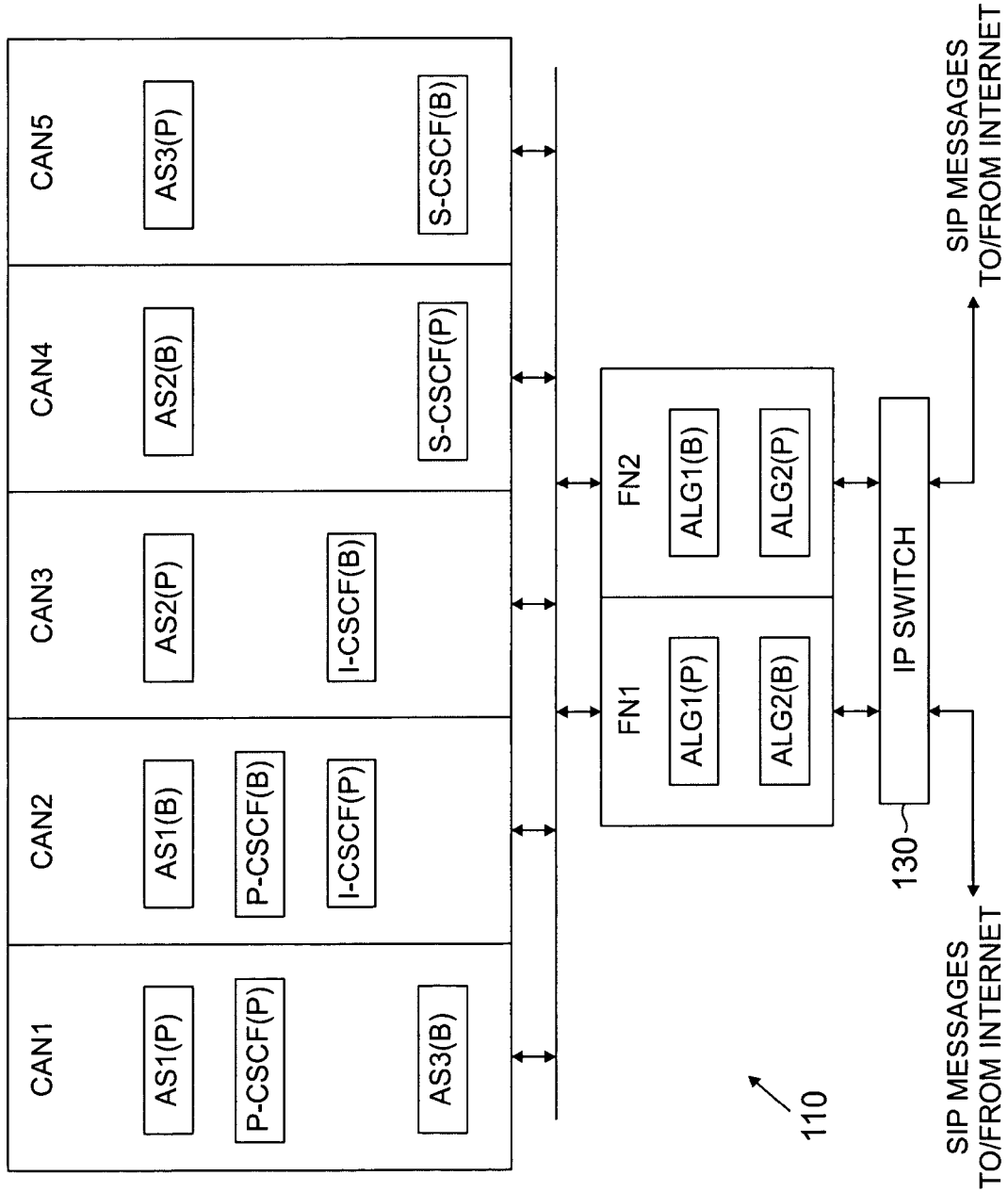
FIG. 2 illustrates the IP multimedia subsystem (IMS) in greater detail according to an exemplary embodiment of the present invention.
Figure 3:
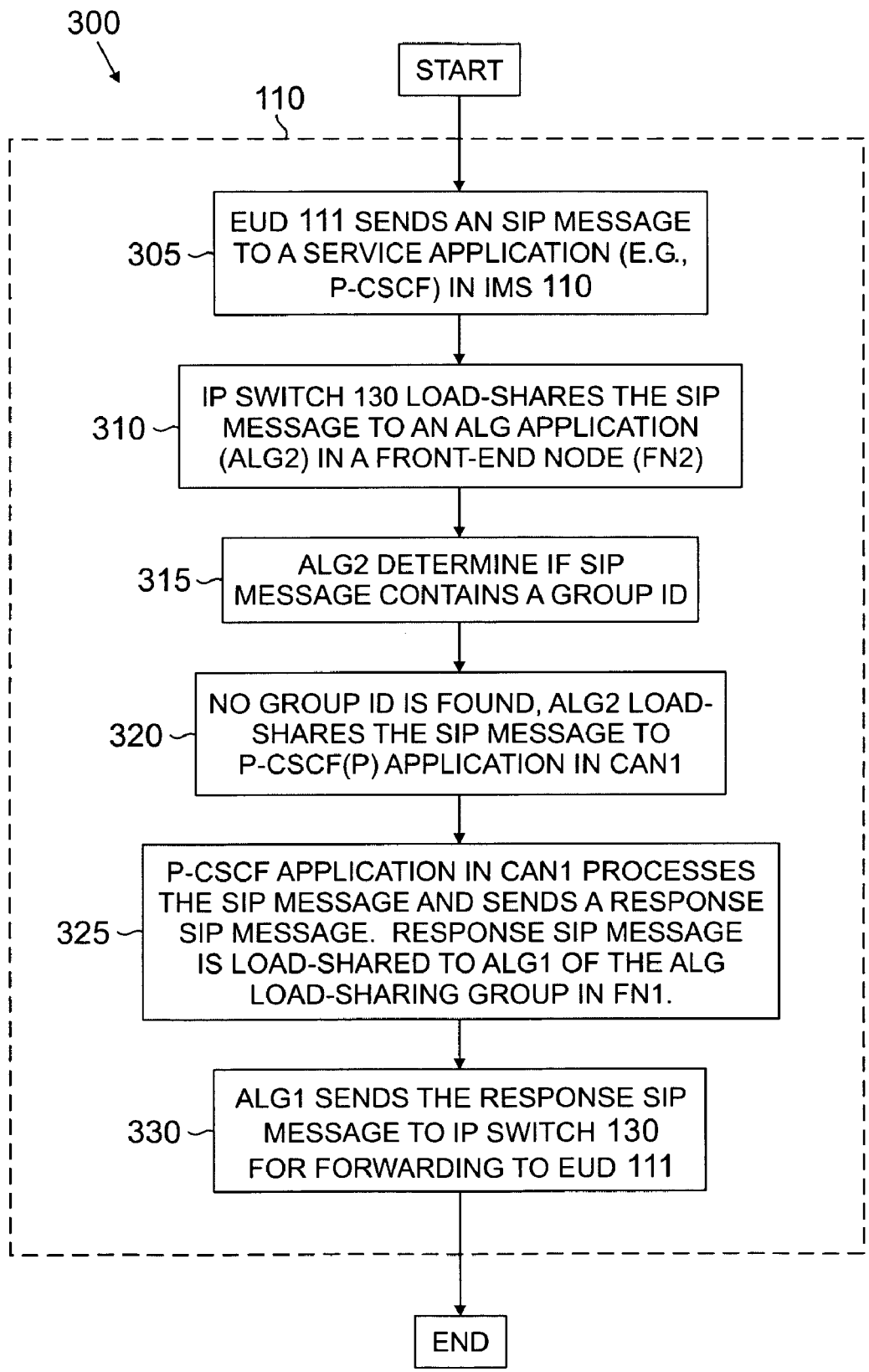
FIG. 3 is a flow diagram illustrating the operation of the IP multimedia subsystem (IMS) according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged IP multimedia subsystem.

FIG. 1 illustrates telecommunication network 100, which comprises IP multimedia subsystem (IMS) 110 according to the principles of the present invention. Telecommunication network 100 comprises IP multimedia subsystem (IMS) 110, end-user device (EUD) 111, end-user device (EUD) 112, end-user device (EUD) 113, and end-user device (EUD) 114. End-user devices 111-114 communicate with IMS 110 via a public or a private Internet Protocol (IP) network, such Internet 120. Alternatively, end-user devices 111-114 may communicate with IMS 110 via the public switched telephone network (PSTN). In the exemplary embodiment, end-user devices 111 and 112 may be Voice-over-IP devices, such as Internet phones, and end-user devices 112 and 114 may be processing systems, such as personal computers (PCs) or servers, or other networks.

IP multimedia subsystem (IMS) 110 provides IP multimedia services including, for example, streaming audio, streaming video, text messaging, chat, and the like, to end-user devices 111-114 over Internet 120. IMS 110 comprises Internet protocol (IP) switch 130, front-end (or firewall) server group 140, and application server group 150. Front-end server group 140 comprises a plurality of front-end (or firewall) nodes, including front-end node (FN) 141 and front-end (FN) node 142. Applicant server group 150 comprises a plurality of call application nodes, including call application node (CAN) 151, call application node (CAN) 152, and call application node (CAN) 153.

Each of front-end nodes 141 and 142 comprises an application level gateway (ALG) application, such as ALG application 143 in FN 141. Each of call application nodes 151-153 contains control applications (or programs) for providing a plurality of call control functions or services, including, for example, policy decision function (PDF) applications, various types of application server (AS) applications, IMS-service switching functions (IM-SSF) applications, proxy call session control function (P-CSCF) applications, serving call session control function (S-CSCF) applications, interrogator call session control function (I-CSCF) applications, and other control software.

The IMS standard specifies the use of the Session Initiation Protocol (SIP) messages between external network entities (e.g., end-user devices 111-114) and entities internal to IMS 110 (e.g., call applications nodes 151-153). The SIP message protocol is used, for example, between end-user devices 111-114 and the P-CSCF applications, the I-CSCF applications, the P-CSCF applications and the AS applications. SIP message traffic also occurs between the CSCF applications, which may be located anywhere in the network. The expected network traffic varies from system to system. An IP multimedia subsystem according to the principles of the present invention provides easily scalability for handling varying traffic loads. The exemplary IMS 110 also is secure, fault tolerant, and highly available.

In IMS 110, the SIP stack is over UDP or TCP. End-user devices 111-114 send SIP messages that are targeted to a particular type of service. Each type of service is given an IP address provided by IP switch 130. As an example, there is a first IP address for the P-CSCF applications, a second IP address for the I-CSCF applications, a third IP address for the S-CSCF applications, and additional addresses for each type of AS application in IMS 110. IP switch 130 load-shares each received SIP message to group 140 of front-end nodes.

An ALG application in each front-end node receives the SIP message. The ALG application (e.g., ALG application (143) examines the SIP message to determine its route. The ALG application then routes the message to the appropriate target application. The applications are organized into load-sharing groups by application type, such as P-CSCF, I-CSCF, S-CSCF, and one for each different type of AS. The mechanism for forming and using load-sharing groups is disclosed in U.S. patent application Ser. No. 10/038,878, filed on Dec. 31, 2001 and entitled "System and Method for Distributed Call Processing Using Load-Sharing Groups." The disclosure and teachings of U.S. patent application Ser. No. 10/038,878 are hereby incorporated by reference into the present application as if fully set forth herein.

FIG. 2 illustrates IP multimedia subsystem (IMS) 110 in greater detail according to an exemplary embodiment of the present invention. In FIG. 2, IMS 110 implements two front-end nodes (i.e., FN1 and FN2) and five call application nodes (i.e., CAN1, CAN2, CAN3, CAN4, and CAN5). The services or functions provided by CAN1-CAN5 and FN1 and FN2 are implemented as group services. Each load-sharing group consists of one of more primary-backup groups, where each primary-backup group is implemented as a primary (P) application and a backup (B) application. For example, in FIG. 2, an application server (AS) load sharing group is implemented as three primary-backup groups, AS1, AS2 and AS3. AS1 comprises a primary application, AS1(P), and a backup application, AS1(B). AS2 comprises a primary application, AS2 (P), and a backup application, AS2(B). AS3 comprises a primary application, AS3(P), and a backup application, AS3 (B).

The server applications AS1, AS2 and AS3 all perform the same function. The primary members AS1(P), AS2(P), and AS3(P) perform the actual work, while the backup members, AS1(B), AS2(B), AS3 (B) remain available and are updated in the background in case of failure by the corresponding primary group member. In FIG. 2, only one AS application is shown. However, if other application server (AS) applications are implemented, the AS applications A, B and C may be identified as AS-A, AS-B, and AS-C. Primary-backup groups associated with, for example, AS-A, may then be identified as AS-A1(P) and AS-A1(B), AS-A2(P) and AS-A2(B), AS-A3 (P) and AS-A3(B), and so forth. For the sake of simplicity, the P-CSCF, I-CSCF, and S-CSCF applications are each illustrated as comprising only one primary-backup group. However, in alternate embodiments, each of these CSCF applications may comprise a plurality of primary-backup groups.

A group service provides a framework for organizing a group of distributed software objects in a computing network. Each software object provides a service. In addition, the group service framework provides enhanced behavior for determining group membership, what actions to take in the presence of faults, controlling unicast, multicast, and groupcast communications between members and clients for the group, and the like. A group utilizes a policy to enhance the behavior of the services provided by the group. Some of these policies include primary/backup for high service availability and load-sharing algorithms for distributing the loading of services within a network.

Application server (AS) applications located within IMS 110 provide services that are invoked by client applications that may be located in, for example, end-user devices 111-114. As shown, the AS applications are organized into primary/backup groups. There are multiple numbers (i.e., 3 in FIG. 2) of these primary/backup groups and the exact number is scalable according to the number of processes and/or computing nodes that are used. All of the primary/backup groups of the same type form a single load-sharing group. Thus, AS1, AS2, and AS3 form a single load-sharing group (LSG).

A client application establishes an interface to the load-sharing group. The client application may either load share a message to one of the members of the load-sharing group or may send the message directly to a specific member. Each primary/backup group is identified by a particular group identity. When a message is sent to a member that was selected by a load-sharing algorithm, this is referred to as "load-sharing" the message. When the message is sent using a group identity, this is referred to as "Group ID-based routing."

Each service type has its own load sharing group. As an example, there is a P-CSCF load sharing group, an I-CSCF load sharing group, an S-CSCF load sharing group, and a load sharing group for each type of AS application. A load sharing group has one or more members. Each member is the primary element in a primary/backup group and resides within some application that executes within a call application node. Applications may be added to or removed from a load-sharing group at any time—either through failure or configuration. As long as at least one member of the group is active, the corresponding service will be being provided.

In order to be fault tolerant and to be highly available, the primary and backup members of each group in a load-sharing group are striped across the available CAN nodes. As an example, if three CAN nodes are implemented, the normal primary (P) for primary/backup Group 1 (PBG1) is in CAN1 and the backup (B) is in CAN2. The normal primary (P) for PBG2 is in CAN2 and the backup (B) is in CAN3. The normal primary for PBG3(P) is in CAN3 and the backup (B) is in CAN1. The primary member is the service provider and equalizes the state of the primary with that of the backup. If the primary should fail, the backup takes over and continues to provide service until the primary is reloaded and assumes the role of primary. Failover is transparent to client users of the primary/backup group.

The ALG application located in each front-end node is also organized into a load-sharing group. In the example, the ALG load-sharing group comprises two primary-backup groups, namely ALG1 and ALG2. ALG1 and ALG 2 perform the same function. Each one of ALG1 and ALG2 consists of a primary member and a backup member. As before, the primary members, ALG1(P) and ALG2(P), and the backup members, ALG1(B) and ALG2(B), are striped across the available number of front-end nodes, which may be added to or removed at anytime transparent to the service that is being provided.

FIG. 3 is a flow diagram illustrating the operation of IP multimedia subsystem (IMS) 110 according to an exemplary embodiment of the present invention. It is assumed that five (5) call application nodes (i.e., CAN1-CAN5) and two (2) front-end nodes (FN1 and FN2) are implemented. Initially, an external end-user device (i.e., EUD 111) generates a SIP INVITE message targeted towards the P-CSCF application IP address provided by IP switch 130 (process step 305). IP switch 130 load-shares the SIP message to one of FN1 and FN2 (process step 310). For this example, it is assumed that ALG2(P) in FN2 receives the SIP message. ALG2(P) examines the SIP message routing fields for a URL containing a Group ID (process step 315).

If there is no Group ID, then ALG2(P) load-shares the SIP message to one of the CAN nodes (e.g., CAN1) using the P-CSCF load-sharing group (LSG) (process step 320). Since there is only one primary-backup group for the P-CSCF LSG, this particular application instance services all transactions associated with the INVITE and subsequent messages. ALG2 (P) accesses the P-CSCF service because ALG2(P) received the SIP message over a P-CSCF socket. The P-CSCF primary member, P-CSCF(P), processes the SIP message and sends a response SIP message in reply. P-CSCF(P) load-shares the response SIP message to the ALG load-sharing group, which selects FN1 (process step 325). ALG1(P) in FN1 receives the SIP message and an address to which to send the message. ALG1(P) sends the message and IP switch 130 routes the response to end-user device (EUD) 111 (process step 330).

At this point, the SIP response message contains a route entry that identifies the P-CSCF application in CAN1. End-user device 111 adds this route entry to the SIP message when end-user device 111 sends another message back to IMS 110. If a second SIP message is then sent by EUD 111 and received by ALG1(P) in FN1, ALG1(P) looks at the message route entry and discovers the Group Id for the P-CSCF application in CAN1. The SIP message is then sent to the P-CSCF server in CAN1.

IP switch 130 is configured to provide an IP address for SIP by service type. End-user devices 111-114 send messages using the IP address for the service type that is required. For example, there is an P-CSCF IP address, an I-CSCF IP address, a S-CSCF IP address, and an IP address for each type of AS. Associated with each service type IP address is a pool of IP addresses—one for each front-end node in the system. Multiple IP addresses are assigned to each front-end node—one for each type of service. IP switch 130 load-shares each arriving message targeted to the service type IP address to the service type pool of available front-end nodes.

If a front-end node should fail, IP switch 130 stops sending messages to that node. When the front-end node recovers, IP switch 130 again distributes messages to that node. IP switch 130 determines when the node fails by sending ping messages to the node. When a ping message is no longer returned, IP switch 130 assumes that the node has failed. This method, however, does not indicate whether or not the ALG application is running. IP switch 130, by itself, might continue to send SIP messages to a front-end node even though the ALG application has failed. This would result in lost message traffic. The ALG application described below handles this failure scenario.

ALG applications send messages to end-user devices by using the IP addresses of the end-user devices. IP switch 130 routes the message to the correct end-user device. IP switch 130 is configured to support both IPV6 and IPV4 connections. NAT-PT is used to translate between IPV4 messages and IPV6 messages for IPV4 networks. IP switch 130 also supports IPV6 tunneling over IPV4 networks.

IP switch 130 is configured to have an IP address for each service type. Front-end nodes may easily be added or removed by changing the service type pool in IP switch 130. This enhances the scalability of IMS 110. IP switch 130 provides network address translation between the service type IP address and the internal FN pool address. This enhances the security of the system. IP switch 130 detects front-end node failures and routes messages to available nodes. This enhances the high availability of the system.

The SIP message protocol stack may be over either UDP or TCP. For UDP, IP switch 130 load-shares each arriving message to the available pool of front-end nodes. For TCP, IP switch 130 controls the connection behavior for any one TCP connection. For any one end-user device, there is a single TCP connection between the end-user device and IP switch 130. IP switch 130 permits a connection from each FN to be associated with the single end-user device connection. IP switch 130 then load-shares each message across each TCP connection to each front-end node.

IPV4 and IPV6 networks must be supported according to the 3GPP IMS requirements. The FN Ethernet interface to IP switch 130 is configured as an IPV6 socket. Call application nodes, such as CAN1-CAN5, are not required to be IPV6, but can be configured as such. By putting an IPV6 interface in the front-end node, call application node servers do not have to be responsible for address translation between IPV4 and IPV6 addresses. The ALG applications perform a simple translation between IPV4 to IPV6 by adding the IPV6 prefix [::ffff: 0:0].

Each front-end node is configured with a VIP (Virtual IP address), one for each service type. The VIP address is referred to as virtual because it migrates between two different nodes. For example, for one P-CSCF service, one I-CSCF service, one S-CSCF service, and one AS, each front-end node would be configured with four VIP addresses. All of the P-CSCF VIP addresses (one for each FN) are configured into the P-CSCF pool in IP switch 130 for the P-CSCF service type. The same is true for the other service types.

As shown in FIG. 2, each ALG application is a member of a primary/backup group. The primary members and backup members are striped across the available front-end nodes. For two front-end nodes, FN1 and FN2, the primary for ALG1 is in FN1 and the backup for ALG1 is in FN2. Similarly, the primary for ALG2 is in FN2 and the backup for ALG2 is in FN1. All primary members join the ALG load-sharing group (LSG). The primary for SIP is completely stateless and no equalization with the backup occurs. Instead, the backup is used for service availability.

The primary for ALG1 (i.e., ALG1(P)) in FN1 adds the P-CSCF VIP to the local Ethernet interface on initialization. ALG1(P) then sends a Gratuitous ARP message to IP switch 130 announcing that the VIP address is associated with the FN1 MAC address. A Gratuitous ARP message is an unsolicited message sent as an ARP Request message to IP switch 130. If, in the future, IP switch 130 sends an ARP Request message for the VIP address, ALG1(P) replies that the VIP is on the MAC address for FN1. If ALG1(P) fails, Group Services detects the failure and notifies ALG1(B) to become primary. The new primary, ALG1(B), in FN2 modifies the VIP/MAC address association in FN1 and associates the VIP address with the MAC address of FN2. The new primary in FN2 then sends a Gratuitous ARP message to IP switch 130 announcing the interface change. For any subsequent queries by IP switch 130 for the VIP address, ALG1(B) in FN2 provides the ARP Reply. This mechanism provides error recovery for a loss of an ALG server that IP switch 130 cannot determine. This mechanism is called IP Takeover.

The ALG load-sharing group maintains a Group Service client interface to each of the service-type load-sharing groups (i.e., P-CSCF, I-CSCF, S-CSCF, and all AS load sharing groups). ALG has a socket interface for each service type VIP. When ALG receives a SIP message over a specific VIP address (e.g., the P-CSCF VIP), ALG uses the associated client interface for the service type load-sharing group (e.g., the P-CSCF LSG). ALG either uses the client interface to load-share the message or to use Group ID-based routing to send the message to a specific member of the load-sharing group.

An important aspect of the present invention is the use of Group ID-based routing for SIP messages. For new SIP transactions (e.g., SIP INVITE message), the ALG LSG just load-shares the message to one of the available servers in the service type load-sharing group. When an AS application returns a response, the AS inserts a return route entry as a URI in the SIP message. The URI contains the Group ID for the server that must receive a response message.

When an end-user device receives the message, the end-user device sends a response with the return route entry in the response SIP message. When any ALG instance located in any front-end node receives the message, the ALG instance detects the Group ID embedded in the return route entry. The ALG instance uses that Group ID to route the message to the proper application server. The ALG application is not required to be aware of the number of service type applications in the system. The ALG application only needs to be aware of the different types of service type load sharing groups. Service-type applications may be added, removed, or fail, but ALG can continue to perform its duty as long as there is at least one server running for each service type. This feature permits the system to be linearly scalable and highly available.

The ALG application provides a different load-sharing group for each service type. Application servers load-share SIP messages to one of the load sharing groups according to the required service type. Application servers are not required to target a SIP message to a specific ALG application. The ALG LSG does not require separate service type load-sharing groups for the SIP-UDP stack. This is because with UDP, any message can be sent over any interface because the message is targeted to a specific IP address. For SIP/TCP, the target IP address is associated with the interface and the correct interface must be used. By providing a separate ALG load-sharing group for each service type, any message may be sent over the correct interface.

Service-type application servers send a message to a service type ALG load-sharing group to be routed to a specific end-user device. The ALG application sends the message over the correct service type socket interface.

Service-type application servers are organized into load-sharing groups by service type (i.e., P-CSCF, I-CSCF, S-CSCF, AS, and the like). Call application nodes may be added to or removed at any time without reconfiguration. Call application nodes can fail and recover at any time. Service type application servers can fail and recover at any time. If the primary should fail, the backup takes over and continues to provide service. The failover is transparent to any ALG application since Group Services always routes message traffic to the current primary in the group. The service-type applications are not required to track the number of available front-end nodes, but need only to maintain a client interface for each type of service ALG load sharing group.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, an Internet Protocol (IP) multimedia subsystem comprising:
    an IP switch capable of receiving Session Initiation Protocol (SIP) messages from an external IP network; and
    a plurality of call application nodes capable of executing a plurality of service application groups, wherein each of said service application groups comprises a primary application and a backup application associated with said primary application, wherein said IP switch distributes a first subset of said SIP messages without a group identifier to said plurality of call application nodes according to a load sharing algorithm, wherein each of a second subset of said SIP messages comprises a group identifier capable of identifying one of the service application groups, and wherein said IP switch distributes each SIP message comprising the group identifier to said plurality of call application nodes based on the group identifier, wherein if a group identifier is present the distribution of the SIP message is preformed on the basis of the group identifier, and if no group identifier is present, the distribution of the SIP message is preformed on the basis of the load sharing algorithm.

2. The IP multimedia subsystem as set forth in claim 1, wherein a first one of said plurality of service application groups is executed on a first one of said plurality of call application nodes and is associated with a similar second one of said plurality of service application groups executed on a second one of said plurality of call application nodes separate from said first call application node.

3. The IP multimedia subsystem as set forth in claim 2, wherein said first and second service application groups form a first load-sharing group.

4. The IP multimedia subsystem as set forth in claim 3, wherein said first service application group comprises a first primary application executed on said first call application node and a first backup application associated with said first primary application.

5. The IP multimedia subsystem as set forth in claim 4, wherein said first backup application resides on a call application node other than said first call application node.

6. The IP multimedia subsystem as set forth in claim 5, further comprising a plurality of front-end nodes capable of executing a plurality of application level gateway (ALG) application groups, wherein said IP switch distributes said SIP messages to said plurality of front-end nodes for subsequent distribution to said plurality of call application nodes.

7. The IP multimedia subsystem as set forth in claim 6, wherein a first of said plurality of ALG application groups comprises a first primary ALG application executed on a first front-end node and a first backup ALG application associated with said first primary ALG application.

8. The IP multimedia subsystem as set forth in claim 7, wherein said first backup ALG application resides on a front-end node other than said first front-end node.

9. A telecommunication network comprising:
    a plurality of end-user devices capable of communicating according to the Session Initiation Protocol (SIP);
    a Internet protocol (IP) network coupled to said plurality of end-user devices; and
    an IP multimedia subsystem coupled to said IP network and comprising:
        an IP switch capable of receiving SIP messages from said end-user devices through said IP network, and
        a plurality of call application nodes capable of executing a plurality of service application groups, wherein each of said service application groups comprises a primary application and a backup application associated with said primary application, wherein said IP switch distributes a first subset of said SIP messages without a group identifier to said plurality of call application nodes according to a load sharing algorithm, wherein each of a second subset of said SIP messages comprises a group identifier capable of identifying one of the service application groups, and wherein said IP switch distributes each SIP message comprising the group identifier to said plurality of call application nodes based on the group identifier, wherein if a group identifier is present the distribution of the SIP message is preformed on the basis of the group identifier, and if no group identifier is present, the distribution of the SIP message is preformed on the basis of the load sharing algorithm.

10. The telecommunication network as set forth in claim 9, wherein a first one of said plurality of service application groups is executed on a first one of said plurality of call application nodes and is associated with a similar second one of said plurality of service application groups executed on a second one of said plurality of call application nodes separate from said first call application node.

11. The telecommunication network as set forth in claim 10, wherein said first and second service application groups form a first load-sharing group.

12. The telecommunication network as set forth in claim 11, wherein said first service application group comprises a first primary application executed on said first call application node and a first backup application associated with said first primary application.

13. The telecommunication network as set forth in claim 12, wherein said first backup application resides on a call application node other than said first call application node.

14. The telecommunication network as set forth in claim 13, further comprising a plurality of front-end nodes capable of executing a plurality of application level gateway (ALG) application groups, wherein said IP switch distributes said SIP messages to said plurality of front-end nodes for subsequent distribution to said plurality of call application nodes.

15. The telecommunication network as set forth in claim 14, wherein a first of said plurality of ALG application groups comprises a first primary ALG application executed on a first front-end node and a first backup ALG application associated with said first primary ALG application.

16. The telecommunication network as set forth in claim 15, wherein said first backup ALG application resides on a front-end node other than said first front-end node.

17. For use in an Internet Protocol (IP) multimedia subsystem comprising: i) an IP switch and ii) a plurality of call application nodes for executing a plurality of service application groups, a method of processing Session Initiation Protocol (SIP) messages comprising the steps of:
    receiving SIP messages from an external IP network;
    distributing a first subset of the SIP messages to the plurality of call application nodes according to a load sharing algorithm, wherein each of the service application groups comprises a primary application and a backup application associated with the primary application, and wherein each of a second subset of the SIP messages comprises a group identifier capable of identifying one of the service application groups; and distributing each SIP message comprising the group identifier to the plurality of call application nodes based on the group identifier and the absence of the group identifier.

18. The method as set forth in claim 17, wherein a first one of the plurality of service application groups is executed on a first one of the plurality of call application nodes and is associated with a similar second one of the plurality of service application groups executed on a second one of the plurality of call application nodes separate from the first call application node.

19. The method as set forth in claim 18, wherein the first and second service application groups form a first load-sharing group.

20. The method as set forth in claim 19, wherein the first service application group comprises a first primary application executed on the first call application node and a first backup application associated with the first primary application.

* * * * *

UNITED STATES PATENT AND TRADEMARK OFFICE
CERTIFICATE OF CORRECTION

PATENT NO. : 7,535,915 B2 Page 1 of 1
APPLICATION NO. : 10/974611
DATED : May 19, 2009
INVENTOR(S) : David A. Collins It is certified that error appears in the above-identified patent and that said Letters Patent is hereby corrected as shown below:

Column 1, line 11, delete "patent" and replace with --Patent--.

Signed and Sealed this

Twentieth Day of April, 2010

David J. Kappos
*Director of the United States Patent and Trademark Office*